(12) United States Patent
Bruyere et al.

(10) Patent No.: US 6,178,021 B1
(45) Date of Patent: Jan. 23, 2001

(54) SYSTEM FOR COMPENSATING POLARIZATION DISPERSION OF CHANNELS IN A WAVELENGTH-DIVISION MULTIPLEX SIGNAL

(75) Inventors: Franck Bruyere, Paris; Denis Penninckx, Nozay, both of (FR)

(73) Assignee: Alcatel, Paris (FR)

( * ) Notice: Under 35 U.S.C. 154(b), the term of this patent shall be extended for 0 days.

(21) Appl. No.: 09/340,125

(22) Filed: Jun. 28, 1999

(30) Foreign Application Priority Data

Jul. 6, 1998 (FR) .................................................. 98 08624

(51) Int. Cl.[7] ..................................................... H04J 14/06
(52) U.S. Cl. ......................... 359/122; 359/130; 359/127; 359/161; 359/173; 385/11; 385/37
(58) Field of Search ................... 359/122, 130, 359/127, 161, 173; 385/11, 37

(56) References Cited

U.S. PATENT DOCUMENTS

| 5,508,839 | | 4/1996 | Ono ........................................ 359/278 |
| 5,960,133 | * | 9/1999 | Tomlinson ............................. 385/18 |
| 6,052,393 | * | 4/2000 | Islam ...................................... 372/6 |
| 6,069,719 | * | 5/2000 | Mizrahi ................................. 359/124 |

FOREIGN PATENT DOCUMENTS

| 0 412 717 A2 | 2/1991 | (EP) . |
| 2 758 029 A1 | 7/1998 | (FR) . |

* cited by examiner

Primary Examiner—Leslie Pascal
Assistant Examiner—Vu Lieu
(74) Attorney, Agent, or Firm—Sughrue, Mion, Zinn, Macpeak & Seas, PLLC

(57) ABSTRACT

The invention concerns a system for compensating polarization dispersion of channels in a wavelength-division multiplex signal. In accordance with the invention, the system comprises a plurality of cascaded polarization control modules respectively associated with said channels and a common differential delay generator.

Each polarization control module comprises a drop and insert multiplexer for extracting the signal from the associated channel from the input multiplex signal and inserting a modified channel supplied by a polarization controller.

The system further comprises a control loop for controlling the polarization controllers in response to the optical properties of the channel signals at the output of the differential delay generator and obtaining a compensated multiplex signal.

13 Claims, 4 Drawing Sheets

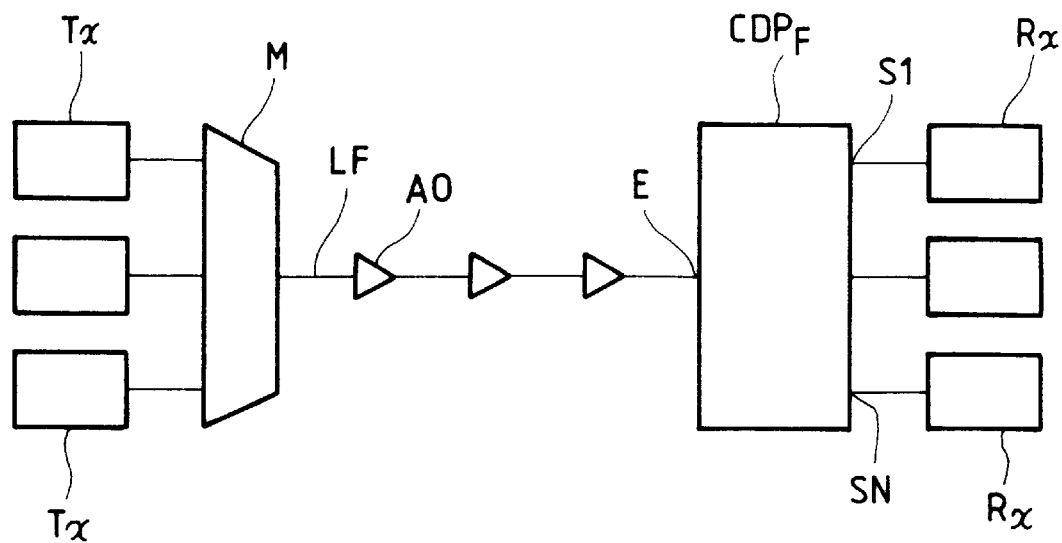
FIG_1A
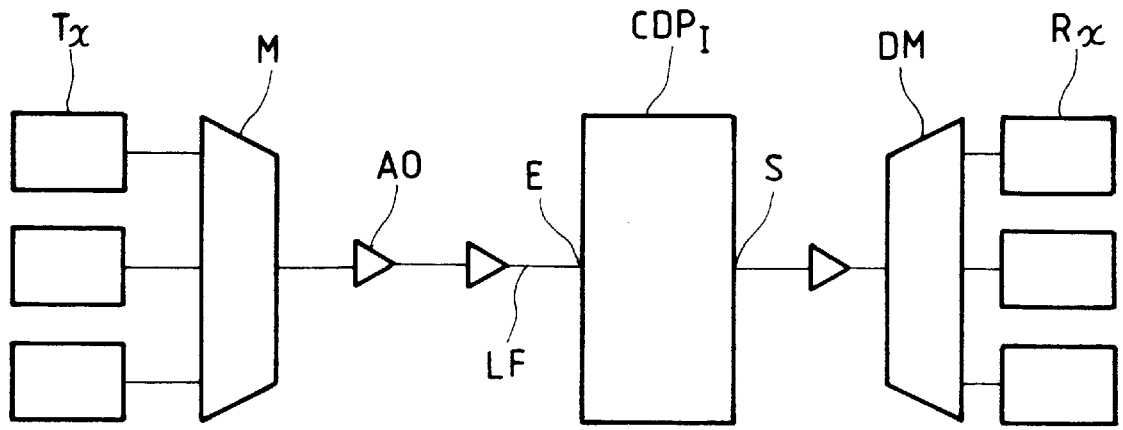
FIG_1B

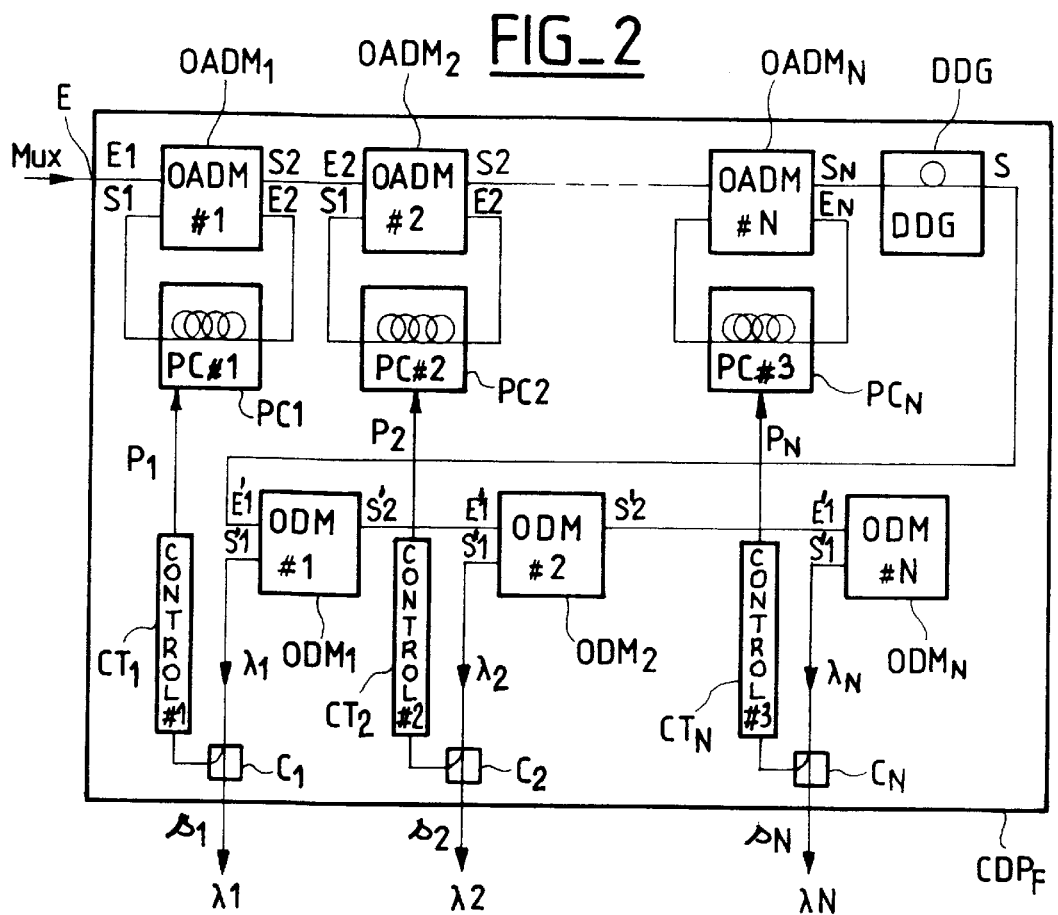
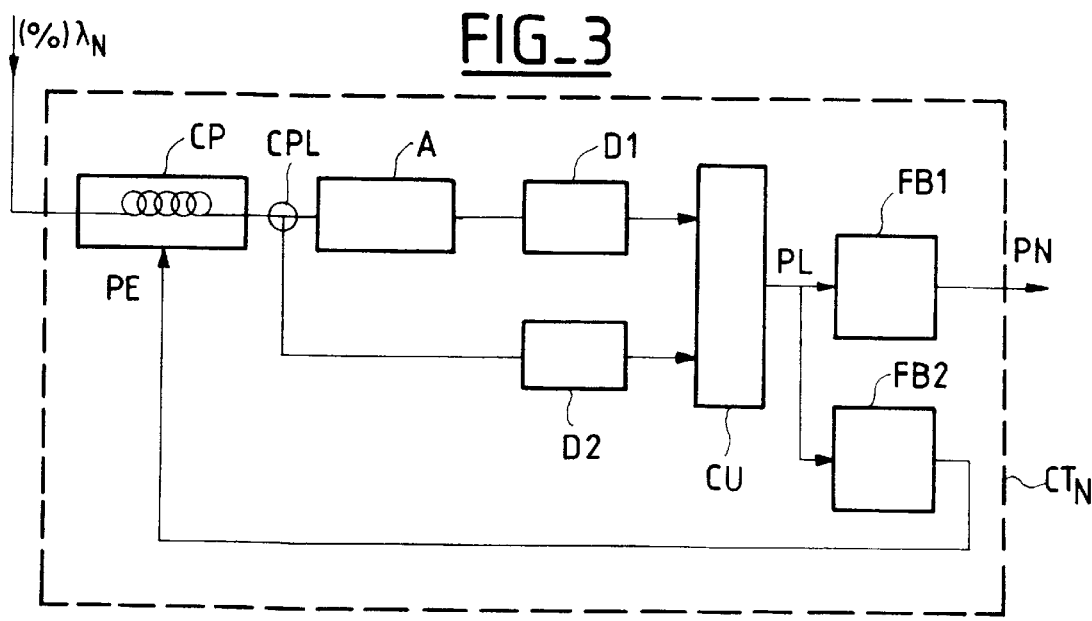

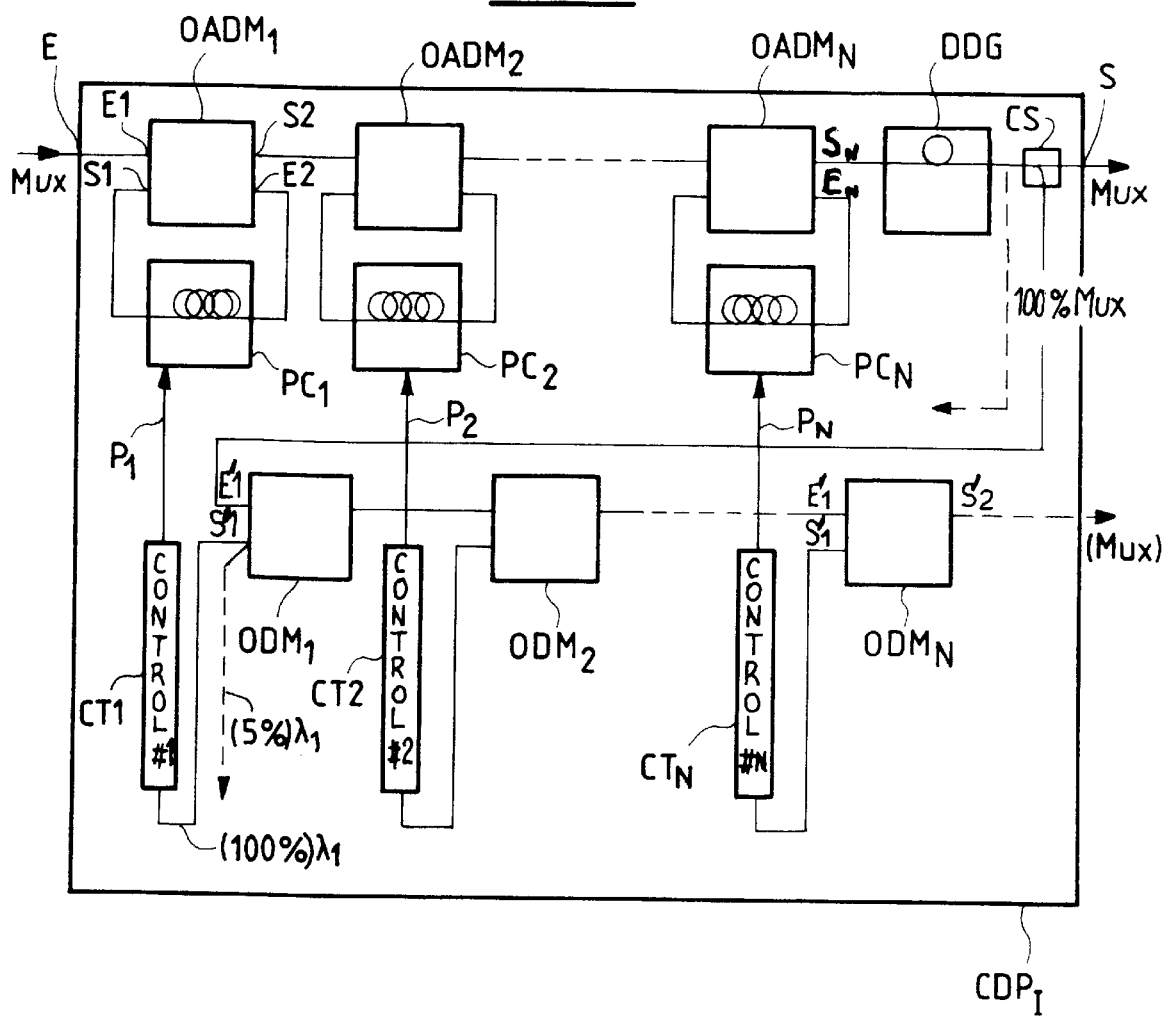

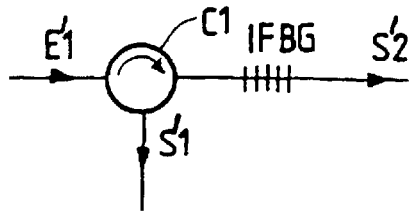
FIG_5A
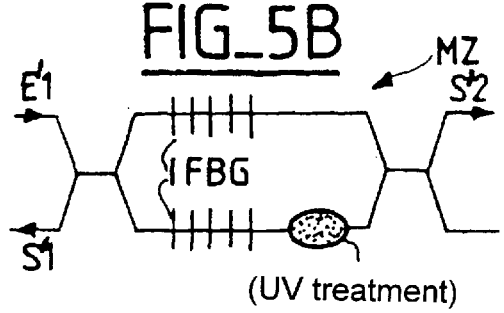
FIG_5B
(UV treatment)
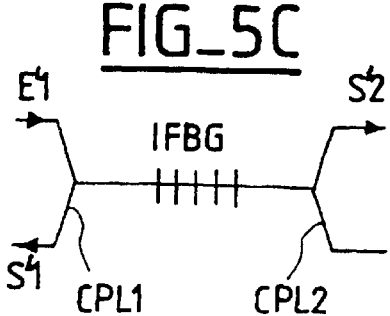
FIG_5C
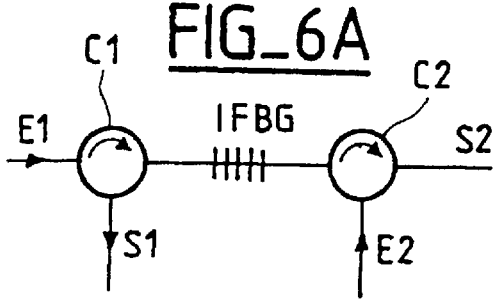
FIG_6A
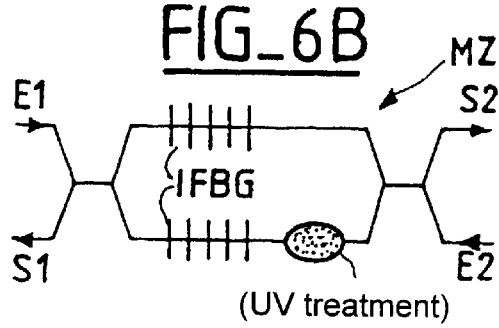
FIG_6B
(UV treatment)
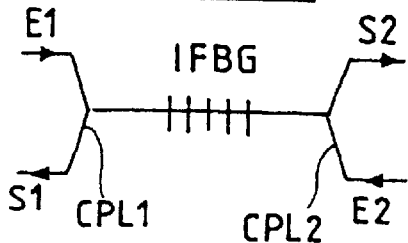
FIG_6C

SYSTEM FOR COMPENSATING POLARIZATION DISPERSION OF CHANNELS IN A WAVELENGTH-DIVISION MULTIPLEX SIGNAL

The invention concerns a device for compensating polarization dispersion of channels in a wavelength-division multiplex signal.

The invention applies to wavelength-division multiplex (WDM) transmission systems.

BACKGROUND OF THE INVENTION

All types of fiber are subject to polarization dispersion: a pulse sent by a sending terminal is deformed when it is received. Its duration is greater than its original duration. The deformation is due to the fact that the optical signal is depolarized during transmission. The signal received at the end of the connecting fiber may be considered to comprise two orthogonal components, one corresponding to a maximum propagation speed polarization state (fastest main polarization state) and the other corresponding to a minimum propagation speed polarization state (slowest main polarization state).

In other words, a pulse signal received at the end of the connecting fiber may be considered to comprise a first pulse signal polarized in accordance with an advanced polarization state and arriving first and a second pulse signal propagating in accordance with a retarded propagation state and arriving with an instantaneous differential delay that depends in particular on the length of the connecting fiber.

If the sending terminal sends an optical signal consisting of a very short pulse, the optical signal received by the receiving terminal comprises two successive pulses polarized orthogonally and having a relative time shift equal to the instantaneous differential delay. This delay can be 20 ps for a 100 km link comprising a monomode fiber of the kind manufactured a few years ago.

Deformation of the pulses received by the receiving terminal can cause errors in decoding the transmitted data and polarization dispersion is therefore a factor limiting the performance of optical links, whether analog or digital.

We now know how to fabricate monomode fibers with low polarization dispersion (approximately 0.05 ps/km$^{1/2}$). However, a high proportion of monomode fibers installed in the last decade have very high polarization dispersion, which constitutes a major technical obstacle to propagation of the transmitted bit rates. Furthermore, if the bit rate race continues, there is nothing to prevent this problem appearing in the low polarization dispersion fibers that we now know how to produce.

We know how to make fibers with high polarization dispersion, also known as maintained polarization fibers, which enable a fixed differential delay to be achieved through the use of short segments. By judiciously placing a component of this kind (or any arrangement generating a differential delay between two orthogonal polarization modes) in series with a transmission link subject to high polarization dispersion, it is possible to compensate the polarization dispersion. This can be achieved either using a maintained polarization fiber having the same differential delay as the link, but interchanging the slow and fast main polarization states, or by having a main polarization state of the combination of the link and the maintained polarization fiber coincide with the polarization state of the sending source. To achieve this a polarization controller is placed between the link and the maintained polarization fiber.

The value of the differential delay and the main polarization states of a link vary in time in accordance with many factors, such as vibration and temperature. A compensator system must therefore necessarily be adaptive and the differential delay of the maintained polarization fiber must be made at least equal to all differential delay values to be compensated.

Polarization dispersion is a difficult problem to solve in the context of upgrading existing optical fiber networks with channels having bit rates of 10 Gbit/s and above.

It is estimated that the maximum polarization dispersion that can be tolerated is 10% of the duration of a bit, for example 10 ps at 10 Gbit/s and only 2.5 ps at 40 Gbit/s.

Polarization dispersion compensator systems have been designed. However, there is no means of solving the problem of polarization dispersion in a wavelength-division multiplex network other than juxtaposing identical single-channel compensator systems after demultiplexing. One example of this is the system disclosed in French Patent Application No. 96 16194 filed Dec. 30, 1996 by the Applicant and concerning a single-channel transmission system of this kind.

OBJECTS AND SUMMARY OF THE INVENTION

The aim of the present invention is to solve the above problem and to propose solutions which have an optimum architecture, in particular in terms of cost.

The present invention consists in a system for compensating polarization dispersion for wavelength-division multiplex systems. The solutions proposed in accordance with the invention are based on the use of cascaded multiplexers and demultiplexers to compensate the polarization dispersion of all the channels forming the multiplex.

System architectures are disclosed for implementation in-line or at the end of the transmission line.

More particularly, the invention consists in a system for compensating polarization dispersion of channels in a wavelength-division multiplex signal, the system comprising a plurality of cascaded polarization control modules respectively associated with said channels and a differential delay generator delivering a compensated multiplex signal, wherein each module comprises:

a drop and insert multiplexer having a first input for receiving a multiplex input signal, a first output for an associated channel signal extracted from said multiplex input signal, a second input for inserting a modified channel signal and a second output for delivering a modified multiplex output signal, and a polarization controller adapted to receive said extracted channel signal and to deliver said modified channel signal, and wherein the system further comprises a control loop for controlling the polarization controllers in response to respective optical properties of the channel signals of said compensated multiplex signal.

Generally speaking, the above optical properties are obviously chosen to be representative of the quality of the compensated multiplex signal so as to measure the degrees of polarization of the channel signals directly or indirectly. The control loop then optimizes the quality of the compensated multiplex signal by operating on the polarization controllers.

In one particular instance, the control loop comprises demultiplexer means receiving the compensated multiplex signal, extraction outputs for said channel signals extracted therefrom and control means adapted to receive at least a portion of the signals from said extraction outputs, to measure the degrees of polarization thereof and to control the polarization controllers to maximize said measured degrees of polarization.

In accordance with another feature, the demultiplexing means include a plurality of demultiplexers in cascade, this embodiment being suited to the use of multiplexers having a structure using fiber segments including in-fiber Bragg gratings (IFBG).

In accordance with another feature, the control means for each channel include:

a feedback loop polarization controller, means for measuring the total intensity of the portion of the signal from one of said extraction outputs, means for measuring the intensity of a component of that portion in a fixed polarization direction and for controlling the loop polarization controller to maximize that intensity, means for calculating the degree of polarization from said measured total intensity and the measured intensity in the fixed polarization direction, and feedback means for controlling the polarization controller of the corresponding channel in accordance with the degree of polarization calculated in this way in order to maximize the degree of polarization.

In accordance with another feature of the invention, the multiplexers and demultiplexers used have a structure using fiber segments including in-fiber Bragg gratings.

BRIEF DESCRIPTION OF THE DRAWINGS

Other features and advantages of the invention will become apparent on reading the following description, which is given by way of non-limiting example and with reference to the drawings, in which:

FIG. 1A is a diagram representing a wavelength-division multiplex transmission system in which a system in accordance with the invention is placed at the end of the line, FIG. 1B shows a transmission system with a system in accordance with the invention incorporated into the transmission line, FIG. 2 shows a system in accordance with the invention designed to be placed at the end of the transmission line, FIG. 3 shows one embodiment of the control circuit $CTN_N$ from FIG. 2, FIG. 4 shows a system in accordance with the invention designed to be incorporated into the transmission line, FIGS. 5A to 5C show three embodiments of a demultiplexer (ODM), FIGS. 6A to 6C show three embodiments of a drop and insert multiplexer (OADM).

MORE DETAILED DESCRIPTION

The wavelength-division multiplex optical transmission system shown in FIG. 1A includes:

conventional transmitter terminals Tx transmitting data, for example by binary modulation of the intensity of one or more optical carriers, each carrier being a fully polarized wave supplied by a laser;

a channel multiplexer M multiplexing the signals from the terminals Tx to obtain a multiplex signal Mux transmitted over the fiber optic line LF connected to the multiplexer; optical amplifiers AO can be incorporated into the fiber LF to compensate optical losses; and a polarization dispersion compensator $CDP_F$, one input of which is connected to the other end of the fiber LF and the outputs of which are connected to respective receiver terminals Rx.

The transmission system shown in FIG. 1B is identical to that from FIG. 1A except that the polarization dispersion compensator $CDP_I$ is on the transmission line LF, an input E of the compensator receives the incoming multiplex transmitted over the line and an output S delivers the compensated outgoing multiplex to the line.

Refer now to FIG. 2. The diagram shows one embodiment of the compensator of the invention designed to be placed at the end of the line, in other words immediately before the receiver terminals. The compensator demultiplexes the multiplex signal and supplies signals at corresponding wavelengths to the receiver terminals Rx.

The compensator includes cascaded polarization control modules provided with respective drop and insert optical multiplexers $OADM_1$ to $OADM_N$ and polarization controllers $PC_1$–$PC_N$.

Each drop and insert multiplexer has two inputs E1, E2 and two outputs S1 and S2. The input E1 of a drop and insert multiplexer receives the multiplex input signal and the input E2 of a multiplexer receives the modified signal from a channel to be inserted in the multiplex delivered at the output S2 of the drop and insert multiplexer.

Accordingly, drop and insert multiplexer $OADM_1$ receives the multiplex signal Mux at its input E1. It extracts the signal from the channel at the wavelength $\lambda 1$. This signal is a available at the output S1 of the circuit and is processed by a polarization controller PC1 as described in detail hereinafter. After processing, the signal from the channel at the wavelength $\lambda 1$ is fed into the input E2 of the circuit $OADM_1$ which inserts it into the multiplex at its output S2. The drop and insert multiplex $OADM_2$ receives at its input E1 the modified multiplex signal from the output S2 of the multiplex $OADM_1$, extracts the signal of the channel at the wavelength $\lambda 2$ and delivers this signal to its output S1. The extracted signal is processed by a polarization controller PC2 which supplies the signal from the channel at the wavelength $\lambda 2$ to its output, whence it is fed to the input E2 of the multiplexer $OADM_2$ which inserts the signal from the channel at the wavelength $\lambda 2$ into the output multiplex delivered to the output S2, and so on for all the other drop and insert multiplexers.

The multiplex signal delivered to the output SN of the last drop and insert multiplexer of the cascade is fed into the differential delay generator DDG.

The differential delay generator DDG can be implemented in the conventional way by means of a maintained polarization fiber, for example. The output signal of the generator DDG constitutes a compensated multiplex signal. This enters a control loop enabling each polarization controller to receive a control signal in response to optical properties of the compensated signal of each channel.

In a preferred embodiment of the invention the control loop includes means for measuring the degree of polarization of the compensated signal of each channel from the differential delay generator DDG and for controlling each of the polarization controllers in order to maximize the measured degree of polarization.

In a preferred embodiment, the control loop comprises a plurality of cascaded demultiplexers $ODM_1$ to $ODM_N$. Each demultiplexer $ODM_1$–$ODM_N$ has an input E'1 adapted to receiver the compensated multiplex signal output by the differential delay generator DDG and a first output S'1 for extracting the signal from the associated channel, a portion of which is applied to the input of a respective control circuit $CT_1$–$CT_N$. Each circuit $CT_1$–$CT_N$ is adapted to measure the degree of polarization of the optical signal from the channel concerned and to control the corresponding polarization controller $PC_1$–$PC_N$ to maximize the measured degree of polarization.

In practice the output S'1 of the demultiplexer $ODM_1$ is connected to the input of a coupler $C_1$ for sampling a portion of the signal from the channel carried by the wavelength λ1 (approximately 5% of that signal) and to apply it to the input of the circuit $CT_1$ supplying the electrical control signal $P_1$ to the polarization controller $PC_1$. A second output of the coupler $C_1$ corresponding to the output sl of the controller $CDP_F$ supplies the signal from the channel at wavelength λ1.

Similarly, the demultiplexers $ODM_2$ and $ODM_N$ deliver at their output S'1 the optical signal extracted from the channels at the respective wavelengths λ2–λN. A portion of the extracted optical signal is supplied to the respective circuits $CT_2$ to $CT_N$ which deliver the electrical control signals of the polarization controllers $PC_1$ to $PC_N$.

The signals extracted from each of the channels at the wavelengths λ2 to λN at the outputs $s_2$ to $s_N$ of the controller $CDP_F$ are supplied by the respective couplers $C_2$ to $C_N$.

One embodiment of the circuit controlling the polarization controllers $PC_1$ to $PC_N$ of each of the extracted channels will now be described in detail with reference to the FIG. 3 diagram, which shows this embodiment.

The embodiment of the controller $CT_N$ shown in the figure applies to a polarization compensator as shown in FIG. 2 and equally to a polarization compensator as shown in FIG. 4, to be described hereinafter. The controller is the same whether the compensator is at the end of the line or in the line.

The channel signal is received at the input of a polarization controller CP whose output is connected to the input of a polarizer A whose output signal is applied to the input of a first photoelectric detector D1. The output of the photoelectric detector D1 is connected to the input of a calculator unit CU. A portion of the output signal of the polarization controller CP is sampled by means of a coupler CPL and applied to the input of a second photoelectric detector D2 whose output is also connected to a second input of the calculator unit CU.

The calculator unit has an output which supplies a signal PL representative of the degree of polarization of the optical signal at the output of the differential delay generator DDG.

The controller $CT_N$ further comprises a feedback device FB1 having an input connected to the output of the calculator unit CU and an output supplying the electrical control signal $P_N$ of the corresponding polarization controller, which in this example is polarization controller $PC_N$.

The controller $CT_N$ further comprises a second feedback device FB2 which has an input connected to the output of the calculator unit CU and an output supplying the electrical control signal PE connected to the electrical control input of the polarization controller CP.

The photoelectric detectors D1 and D2 respectively measure the power Pin of the total signal, ignoring an attenuation factor K1, and the power Pp of the signal polarized in accordance with the polarization of the polarizer A, ignoring an attenuation factor K2. The detectors D1 and D2 respectively supply signals with values:

P1=K1.Pin,

P2=K2.Pp.

The attenuation factors K1 and K2 are constant and known. The calculator unit CU calculates the ratio Pp/Pin and activates the feedback devices FB1–FB2 alternately. The feedback device FB2 modifies the electrical control signal of the polarization controller CP so as to orient the advanced polarization direction signal in accordance with the polarization of the polarizer A.

In this case the value of the ratio Pp/Pin is maximized and represents the degree of polarization of the signal, which has a value between 0 and 1.

The feedback device FB1 modifies the electric control signal of the polarization controller $PC_N$ to maximize the measured degree of polarization value PL. The polarization dispersion is then minimized.

The polarization compensator designed to be inserted into the line in the transmission system shown in FIG. 1B will now be described. Refer to FIG. 4 for more details of the implementation of the compensator.

In practice, the compensator is very similar to the compensator just described with reference to FIG. 2; as already mentioned, the differences concern the fact that the polarization compensator $CDP_I$ in this case supplies a compensated multiplex signal at its output S for transmission over the line, instead of supplying a demultiplexed signal at outputs $s_1$–$s_N$.

In a first embodiment, the multiplex signal is supplied at the output of the generator DDG, to be more precise at an output of a coupler CS.

The output of the differential delay generator DDG is connected to the coupler CS which supplies the compensated multiplex signal at one output and a sampled portion of that signal for the control loop at another output. The portion of the multiplex optical signal is applied to the input E'1 of the first demultiplexer $ODM_1$ and the demultiplexer $ODM_1$ extracts the signal of the channel at the wavelength λ1 to supply it at its output S'1 which is connected to the input of the control circuit CT1 of the polarization controller P1.

The output S'2 of the demultiplexer $ODM_1$ supplies the multiplex signals of the channels at wavelengths λ2 to λN. The demultiplexer $ODM_2$ selects and extracts the channel at the wavelength λ2 at its output S'1. The signal from the channel at the wavelength λ2 at that output is applied to the input of the controller CT2 whose output supplies the control signal P2 for the polarization controller PC2. Likewise for the other demultiplexers, up to demultiplexer $ODM_N$.

In a second embodiment, represented by the dashed lines in FIG. 4, the output of the polarization compensator $CDP_I$ is taken from the output of the last demultiplexer, in other words the output of demultiplexer $ODM_N$, rather than the output of the differential delay generator DDG. For this, it is no longer necessary to place the coupler CS at the output of the generator DDG because all of the multiplex signal would be treated in the control loop. On the other hand, each demultiplexer would deliver at its output S'1 only a fraction of the extracted channel signal, the multiplexed optical signals of all the channels being supplied at the output S'2.

The compensated multiplex signal transmitted over the line is then available at the output S'2 of the last demultiplexer $ODM_N$.

Embodiments of the various optimal demultiplexers $ODM_N$ that can be used to implement the polarization compensator of the invention, whether in-line or at the end of the line, will now be described in detail.

A first embodiment is shown in FIG. 5A in which the demultiplexer structure comprises a fiber segment with in-fiber Bragg gratings IFPG and a circulator C1 at the input of the fiber segment.

FIG. 5B shows a second embodiment. This embodiment is a Mach-Zehnder interferometer structure MZ with a fiber segment with in-fiber Bragg gratings IFBG in each branch of the interferometer structure. In practice the fiber of a branch is ultraviolet (UV) treated to match the phase difference between the two arms of the interferometer.

FIG. 5C shows a third embodiment. This is a coupler structure with respective couplers CPL1 and CPL2 and fiber segments with in-fiber Bragg gratings IFBG.

The fiber segments with in-fiber Bragg gratings can be fiber segments in which the Bragg grating is etched or photo-written, for example.

Three embodiments of the optical drop and insert multiplexers $OADM_N$ will now be described by way of example.

FIG. 6A shows a first embodiment which is a structure comprising a fiber segment with in-fiber Bragg gratings IFBG and a circulator C1–C2 at each end of the fiber segment.

FIG. 6B shows a second embodiment which is a Mach-Zehnder interferometer structure MZ with fiber segments and in-fiber Bragg gratings IFBG in each branch.

Finally, FIG. 6C shows a third embodiment in which the drop and insert multiplexer has a coupler structure with fiber segments with couplers CPL1 and CPL2 and in-fiber Bragg gratings IFBG.

As mentioned with reference to FIGS. 5A to 5C, the fiber segments with in-fiber Bragg gratings can incorporate etched or photo-written gratings.

What is claimed is:

1. A system for compensating polarization dispersion of channels in a wavelength-division multiplex signal, the system comprising a plurality of cascaded polarization control modules respectively associated with said channels and a differential delay generator delivering a compensated multiplex signal, wherein each module comprises:

a drop and insert multiplexer having a first input for receiving a multiplex input signal, a first output for an associated channel signal extracted from said multiplex input signal, a second input for inserting a modified channel signal and a second output for delivering a modified multiplex output signal, and a polarization controller adapted to receive said extracted channel signal and to deliver said modified channel signal, and wherein the system further comprises a control loop for controlling the polarization controllers in response to respective optical properties of the channel signals of said compensated multiplex signal.

2. A system according to claim 1, wherein the control loop comprises demultiplexer means receiving the compensated multiplex signal, extraction outputs for said channel signals extracted therefrom and control means adapted to receive at least a portion of the signals from said extraction outputs, to measure the degrees of polarization thereof and to control the polarization controllers to maximize said measured degrees of polarization.

3. A system according to claim 2, wherein the demultiplexer means include a plurality of demultiplexers having respective outputs constituting said extraction outputs and each having an input and a second output, said demultiplexers being connected in cascade by means of their second outputs and their inputs.

4. A system according to claim 2, wherein the control means for each channel include:

a feedback loop polarization controller, means for measuring the total intensity of the portion of the signal from one of said extraction outputs, means for measuring the intensity of a component of that portion in a fixed polarization direction and for controlling the loop polarization controller to maximize that intensity, means for calculating the degree of polarization from said measured total intensity and the measured intensity in the fixed polarization direction, and feedback means for controlling the polarization controller of the corresponding channel in accordance with the degree of polarization calculated in this way in order to maximize the degree of polarization.

5. A system according to claim 3, wherein, to compensate polarization in-line, the system has an input which corresponds to the first input of the first drop and insert multiplexer of the cascade and an output which corresponds to the second output of the last demultiplexer of the cascade in the control loop.

6. A system according to claim 3, wherein the demultiplexers have a structure comprising a fiber segment with in-fiber Bragg gratings and a circulator at the fiber entry.

7. A system according to claim 3, wherein the demultiplexers have a Mach-Zehnder interferometer structure with a fiber segment with in-fiber Bragg gratings in each branch.

8. A system according to claim 3, wherein the demultiplexers have a coupler structure with fiber segments with in-fiber Bragg gratings.

9. A system according to claim 1, wherein, for compensating polarization at the end of the line, the system has an input which corresponds to the first input of the first drop and insert multiplexer of the cascade and N outputs, N corresponding to the number of input multiplex channels and said outputs supplying via couplers respective signals extracted from said extraction outputs of the demultiplexing means of the control loop.

10. A system according to claim 1, wherein, to compensate polarization in-line, the system has an input which corresponds to the first input of the first drop and insert multiplexer of the cascade and an output which supplies said compensated multiplex signal via a coupler.

11. A system according to claim 1, wherein the drop and insert multiplexers have a structure comprising a fiber segment with in-fiber Bragg gratings and a circulator at each end of the fiber segment.

12. A system according to claim 1, wherein the drop and insert multiplexers have a Mach-Zehnder interferometer structure with a fiber segment with in-fiber Bragg gratings in each branch.

13. A system according to claim 1, wherein the drop and insert multiplexers have a coupler structure with fiber segments with in-fiber Bragg gratings.

* * * * *